United States Patent [19]
Barber

[11] Patent Number: 5,600,468
[45] Date of Patent: Feb. 4, 1997

[54] APPARATUS FOR CONVERTING WAVELENGTH-DIVISION MULTIPLEXED OPTICAL SIGNALS

[75] Inventor: John L. Barber, Parker, Tex.

[73] Assignee: JDS Fitel Inc., Nepean, Canada

[21] Appl. No.: 387,596

[22] Filed: Feb. 13, 1995

[51] Int. Cl.$^6$ .............................. H04J 14/02; H01S 3/00
[52] U.S. Cl. ........................ 359/127; 359/124; 359/341; 359/634; 359/114
[58] Field of Search ................................... 359/114, 124, 359/127, 341, 634

[56] References Cited

U.S. PATENT DOCUMENTS

| | | | |
|---|---|---|---|
| 5,050,952 | 9/1991 | Fussgager | 359/114 |
| 5,295,011 | 3/1994 | Heise | 359/114 |
| 5,452,124 | 9/1995 | Baker | 359/127 |

*Primary Examiner*—Leo Boudreau
*Assistant Examiner*—Bhavesh Mehta
*Attorney, Agent, or Firm*—Lane, Aitken & McCann

[57] ABSTRACT

The apparatus extracts from an optical transmission path bidirectionally-propagating groups of wavelength-division multiplexed optical signals, arranges the groups to propagate unidirectionally via an output port, receives a corresponding unidirectional group via an input port, sorts the corresponding unidirectional group into two groups corresponding to those extracted from the transmission path, and returns the two corresponding groups of wavelength-division multiplexed signals to the transmission path so that each group propagates in its original direction. The apparatus comprises first and second bidirectional ports for coupling in series between first and second sections of the transmission path, and a series of optical devices each comprising first, second, third and fourth ports and an optical bandpass filter or other wavelength-selective element. Each of the filters selects a different wavelength. Each device couples optical signals of its selected wavelength entering its first port to emerge from its fourth port, and vice versa; couples optical signals of its selected wavelength entering its second port to emerge from its third port, and vice versa; couples optical signals of other than its selected wavelength entering its first port to emerge via its second port, and vice versa; and couples optical signals of other than its selected wavelength entering its third port to emerge via its fourth port, and vice versa. A first in the series of optical devices has its first and third ports coupled to the bidirectional ports, respectively, for connection to the transmission path, and its second and fourth ports connected to the first and third ports, respectively, of a succeeding one of the series of optical devices. A last in the series of optical devices has its first and third ports connected to the second and fourth ports, respectively, of a preceding one of the series of optical devices, and its second and fourth ports serving for unidirectional output and input ports, respectively, of the apparatus. Any intervening device has its first and third ports connected to the second and fourth ports of the preceding device.

16 Claims, 2 Drawing Sheets

APPARATUS FOR CONVERTING WAVELENGTH-DIVISION MULTIPLEXED OPTICAL SIGNALS

BACKGROUND OF THE INVENTION

1. Technical Field

The invention relates to apparatus for converting optical signals and especially to optical apparatus for use in optical communications systems in which optical signals of different wavelength propagate in opposite directions in a single optical transmission path. The invention is especially applicable to optical apparatus for use with optical communications systems employing wavelength-division multiplexed (WDM) optical signals.

2. Background Art

In optical communications systems, a single optical transmission path, in a suitable transmission medium such as an optical fiber, may convey bidirectional optical signals, i.e. a first optical signal of one wavelength in one direction and a second optical signal of a second wavelength in the opposite direction. In certain situations, it is desirable to treat the bidirectionally propagating signals by means of a device through which the signals must pass unidirectionally from an input to an output. This involves interrupting the transmission path, routing the two signals unidirectionally through the optical treatment device, and then returning them to the transmission path to continue in their original, opposite directions of propagation. For example, where optical signals are propagating in a long transmission line, it may be necessary to amplify the bidirectional signals at an intermediate point. Converting them into unidirectional signals temporarily enables one, unidirectional amplifier to be used, saving expense and avoiding differences of amplification.

It is possible to insert into an optical transmission path a four-port optical device comprising a pair of one quarter pitch graded index rod lenses positioned coaxially end-to-end with a bandpass filter sandwiched between them. A first port and a second port are positioned at the exposed end of one of the lenses and off-center with respect to the axis of the lens. A third port and a fourth port are positioned at the exposed end of the other lens and correspondingly off-center so that a light beam entering one of the ports will be expanded by the rod lens and collimated as it reaches the filter. If transmitted by the filter, the light beam will be refocussed by the other lens to couple to the opposite port. If reflected by the filter, the light beam will be collimated by the same rod lens and coupled to the adjacent port.

The respective ends of the transmission medium are connected to the first and third ports and the amplifier or other equipment is connected between the second and fourth ports. Signals having a wavelength within the passband of the bandpass filter entering one port pass through the filter to emerge from an opposite port. Signals of the other wavelength, however, are reflected by the filter to emerge from the adjacent port. Hence, a first signal having a wavelength outside the passband, arriving at the first port will be reflected to emerge via the second port and pass through the amplifier or other device. A second signal having a wavelength within the pass band of the filter travelling in the opposite direction in the transmission medium will enter the device via the third port, be transmitted by the bandpass filter, and also emerge via the second port. Consequently, both signals will pass through the amplifier in same direction.

On leaving the amplifier, the two signals will enter the device via the fourth port. The first signal will be reflected again by the bandpass filter and emerge at the third port, to propagate along the waveguide in its original direction. The second signal will again be transmitted by the bandpass filter and emerge via the first port, to propagate along the waveguide in its original opposite direction.

Such a device, however, is limited to a single wavelength in each direction. Increasingly, optical communications systems employ wavelength-division multiplexing (WDM) enabling several signals having different wavelengths to be carried by the same waveguide. A single waveguide might carry any number of different wavelengths in each direction there being, theoretically, no upper limit. Consequently, there is a need for a device which will convert wavelength-division multiplexed signals propagating in a single waveguide into unidirectional signals and then back into bidirectional signals again to continue in their original directions of propagation, and vice versa. There is also a need for apparatus for converting bidirectional WDM optical signals to unidirectional optical signals, or vice versa.

SUMMARY OF THE INVENTION

One object of the present invention is to satisfy the afore-mentioned need for apparatus which will convert wavelength-division multiplexed signals propagating bidirectionally in a single transmission path into unidirectional signals and then back into bidirectional signals again to continue in their original directions of propagation, and vice versa.

Another object of the present invention is to satisfy the afore-mentioned need for apparatus for converting bidirectional WDM optical signals to unidirectional WDM optical signals, or vice versa.

According to one aspect of the present invention, there is provided apparatus for extracting from an optical transmission path bidirectionally-propagating groups of wavelength-division multiplexed optical signals, arranging the groups to propagate unidirectionally via an output port, receiving a corresponding unidirectional group via an input port, arranging the corresponding unidirectional groups in two groups corresponding to those extracted from the transmission path, and returning the two corresponding groups to the transmission path so that each group propagates in its original direction.

According to a preferred embodiment of the invention, there is provided apparatus for extracting from an optical transmission path bidirectionally-propagating groups of wavelength-division multiplexed optical signals, arranging the groups to propagate unidirectionally via an output port, receiving a corresponding unidirectional group via an input port, arranging the corresponding unidirectional groups in two groups corresponding to those extracted from the transmission path, and returning the two corresponding groups to the transmission path so that each group propagates in its original direction, the apparatus comprising:

first and second bidirectional ports for coupling in series between first and second sections of the transmission path;

a series of two or more optical devices each comprising first, second, third and fourth ports and wavelength-selective means, each of the plurality of wavelength-selective means selecting a different wavelength, each device coupling optical signals of its selected wavelength entering its first port to emerge from its fourth port, and vice versa, and coupling optical signals of its selected wavelength entering its second port to emerge from its third port, and vice versa; and coupling optical signals of other than its selected wavelength entering its first port to emerge via its second port, and vice versa, and coupling optical signals of other than its selected wavelength entering its third port to emerge via its fourth port, and vice versa;

each optical device other than the first device in the series having its first and third ports coupled to the second and fourth ports, respectively, of the preceding device and its second and fourth ports connected to the first and third ports, respectively, of the succeeding device, the first optical device having its first and third ports connected to the bidirectional ports for connection to the transmission path, and the last in the series of optical devices having its second and fourth ports constituting unidirectional output and input ports, respectively, of the apparatus.

According to a second aspect of the invention there is provided apparatus for extracting from an optical transmission path bidirectionally-propagating groups of wavelength-division multiplexed optical signals and arranging the groups to propagate unidirectionally via an apparatus output port, comprising:

an input port and an output port for coupling the apparatus in series with first and second sections of a bidirectional transmission path;

a series of two or more optical devices, each having first, second, third and fourth ports and wavelength-selective means, each of the plurality of wavelength-selective means selecting a different wavelength, each device coupling optical signals of its selected wavelength entering its first port to emerge from its fourth port, and vice versa, and coupling optical signals of its selected wavelength entering its second port to emerge from its third port, and vice versa; and coupling optical signals of other than its selected wavelength entering its first port to emerge via its second port, and vice versa, and coupling optical signals of other than its selected wavelength entering its third port to emerge via its fourth port, and vice versa;

each optical device other than the first device in the series having its first and third ports coupled to the second and fourth ports, respectively, of the preceding device in the series and its second and fourth ports connected to the first and third ports, respectively, of the next device in the series, the first optical device having its first and second ports connected to the input and output ports, respectively, and the last in the series of optical devices having its second port coupled to the apparatus output port.

According to a third aspect of the invention, there is provided apparatus for converting a group of unidirectionally-propagating wavelength-division multiplexed signals into two groups of bidirectionally propagating signals for insertion into an optical transmission path, comprising:

an apparatus input port for receiving the first group of unidirectionally-propagating signals, and first and second bidirectional ports for coupling in series between first and second sections of the transmission path;

a series of two or more optical devices each comprising first, second, third and fourth ports and wavelength-selective means, each of the plurality of wavelength-selective means selecting a different wavelength, each device coupling optical signals of its selected wavelength entering its first port to emerge from its fourth port, and vice versa, and coupling optical signals of its selected wavelength entering its second port to emerge from its third port, and vice versa; and coupling optical signals of other than its selected wavelength entering its first port to emerge via its second port, and vice versa, and coupling optical signals of other than its selected wavelength entering its third port to emerge via its fourth port, and vice versa;

each optical device other than the first device in the series having its first and third ports coupled to the second and fourth ports, respectively, of the preceding device and its second and fourth ports connected to the first and third ports, respectively, of the succeeding device, the first optical device having its first and third ports connected to the bidirectional ports for connection to the transmission path, and the last in the series of optical devices having its fourth port coupled to the apparatus input port.

Advantageously, each optical device may comprise a pair of one quarter pitch graded index lenses with their respective first ends juxtaposed, the wavelength-selective means comprising an optical bandpass filter disposed between the juxtaposed first ends, the first and second ports being positioned at a distal end of one of the lenses and the third and fourth ports being positioned at a distal end of the other of the lenses, the optical bandpass filter having different passbands, the wavelengths of the optical signals falling within one of the passbands.

Advantageously, where the number of signals in one of said groups is to be less than the number of signals in the other of said groups, the number of optical devices and the wavelengths of the wavelength selective means may correspond to those of the one group of signals.

Various objects, features, aspects and advantages of the present invention will become more apparent from the following detailed description, taken in conjunction with the accompanying drawings, of preferred embodiments of the invention which are described by way of example only.

DESCRIPTION OF THE PREFERRED EMBODIMENT

Figure 1:
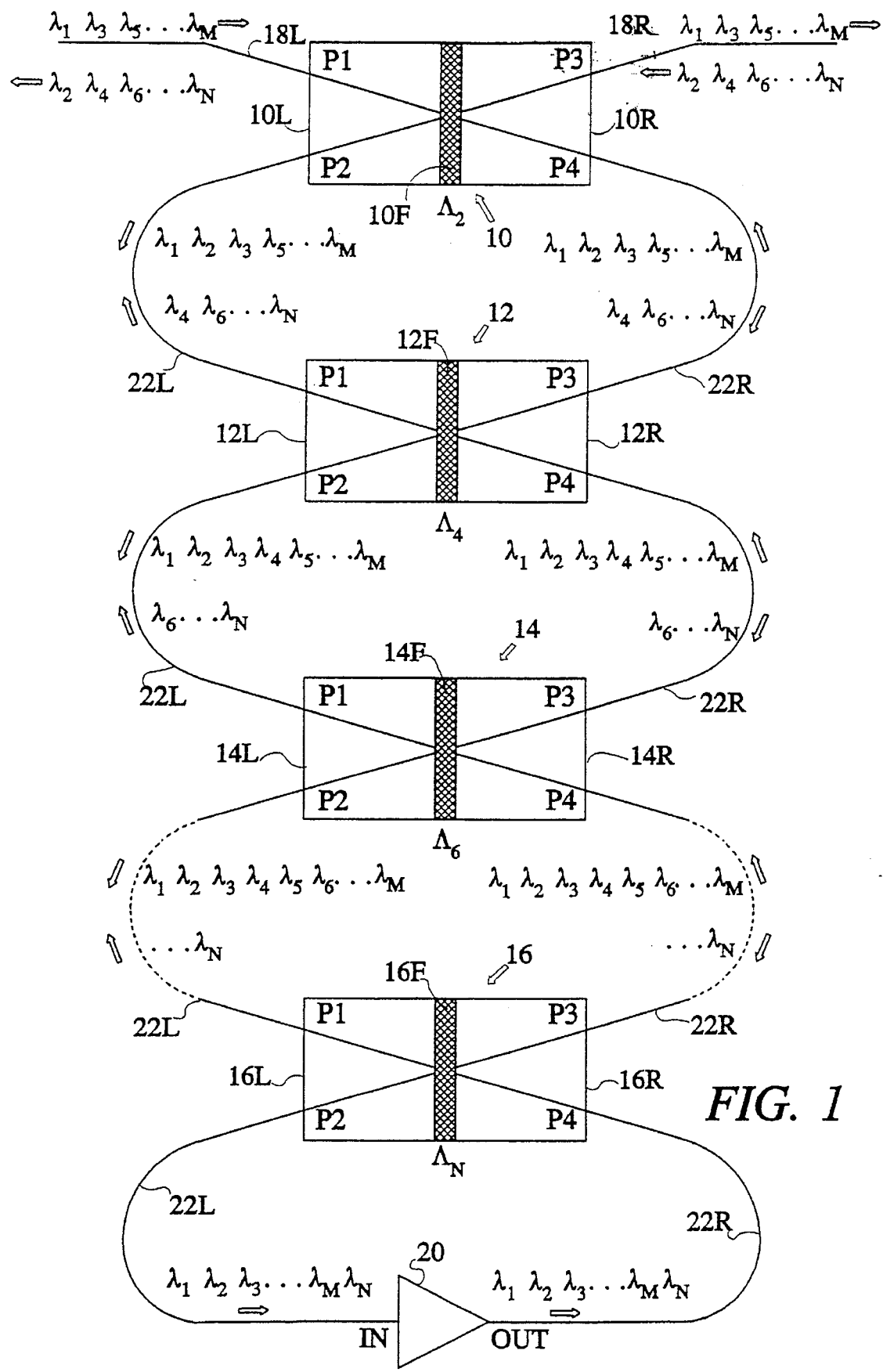
FIG. 1 is a schematic representation of two sections of an optical transmission medium along which two groups of wavelength-division multiplexed signals propagate in opposite directions and a set of wavelength-selective devices for diverting the groups from the transmission line, routing them unidirectionally through an amplifier, and then returning them to the transmission line to continue propagating in their original opposite directions.

Referring first to FIG. 1, apparatus for translating optical signals from bidirectional propagation to unidirectional propagation, and back again, comprises a series of wavelength-selective devices 10, 12, 14 and 16, each having four ports designated P1, P2, P3 and P4, respectively. Each device comprises two graded-index one quarter pitch lenses disposed end-to-end with an optical bandpass filter sandwiched between their juxtaposed ends. Suitable such lenses are available as SELFOC (trade mark) lenses. In view of the symmetry of the apparatus shown in the drawing, for convenience, reference numbers will, where appropriate, have the suffix "L" or "R" to identify whether it is at the right hand side or the left hand side, as shown. Thus, the left hand lenses of devices 10, 12, 14 and 16 are designated 10L, 12L, 14L and 16L, respectively, and the right hand lenses are designated 10R, 12R, 14R and 16R, respectively. The lenses are arranged so that light beams from each first port P1 will be collimated by the left-hand lens to illuminate substantially the whole of the corresponding bandpass filter and refocussed by the right-hand lens to couple into the opposite port P4—and vice versa. Likewise, light beams from the second port P2 will be collimated as they pass through the filter and refocussed to couple into the opposite third port P3—and vice versa. Where the collimated light beams from one port are reflected by the filter, they will be refocussed by the same lens but couple to the adjacent port.

Whereas the lenses are identical, each of the bandpass filters, designated 10F, 12F, 14F and 16F, respectively, will transmit a different band of wavelengths. The passbands of the bandpass filters 10F, 12F, 14F and 16F are designated $\Lambda_2$, $\Lambda_4$, $\Lambda_6$ and $\Lambda_N$, respectively. Each bandpass filter will pass light beams having a wavelength within its passband to couple to the opposite port and reflect light beams having a wavelength outside its passband so that they couple to the adjacent port. Light which passes through or is reflected from the optical band pass filter at the proper angle is refocused by the lens to a point sufficiently small to transfer the light from the lens couples into the fiber with minimum loss.

The first port P1 and the third port P3 of the first device 10 are connected to respective ends of first and second sections 18L and 18R of an optical fiber transmission line. The transmission line supports propagation of two groups of wavelength-division multiplexed (WDM) optical signals, one in each direction. In the drawing, even-numbered optical signals, designated as $\lambda_2$ through $\lambda_N$, propagate from right to left in the transmission line and odd-numbered optical signals $\lambda_1$ through $\lambda_M$ propagate from left to right. It should be noted that optical signal $\lambda_2$ will have a wavelength within the passband $\Lambda_2$ of filter 10F, optical signal $\lambda_4$ will have a wavelength within the passband $\Lambda_4$ of filter 12F, and so on. The four devices 10, 12, 14 and 16 are "chained" in that the second and fourth ports P2 and P4 of each of the first three devices 10, 12 and 14 are connected to the first and third ports P1 and P3, respectively, of the succeeding device. The second port P2 and fourth port P4 of the final device 16, however, are connected to the input port IN and output port OUT, respectively, of a unidirectional optical amplifier or other signal treatment equipment 20. The interconnections 22 between the various ports of the components may be optical fiber or any other suitable means.

In operation, the chain of four port devices 10–16 extract the two groups of WDM signals from the respective optical fiber sections 18L and 18R, and convert them into a single unidirectional set of signals which is supplied to the input port IN of the amplifier 20. When the unidirectional set of signals leave the output port OUT of the amplifier 20, the chain of devices convert them back into the original two groups of WDM signals and return each group to the other of the optical fiber sections 18L and 18R to continue propagating along the transmission line in the original direction.

Step by step operation of the device shown in FIG. 1 will now be described. As depicted, the odd-numbered first group of WDM optical signals $\lambda_1, \lambda_3, \lambda_5 \ldots \lambda_M$ enter the chain via port P1 of four port device 10 and the even-numbered second group of WDM optical signals $\lambda_2, \lambda_4, \lambda_6 \ldots \lambda_N$ enter the chain from port P3 at the opposite end of four port device 10.

Since four port device 10 contains a $\Lambda_2$ band pass filter (BPF), all of the odd-numbered signals $\lambda_1, \lambda_3, \lambda_5 \ldots \lambda_M$ entering port P1 are reflected by the filter 10F and exit the device 10 via port P2. The even-numbered signals $\lambda_2, \lambda_4 \lambda_6 \ldots \lambda_N$ entering port P3 are split. The signals $\lambda_4, \lambda_6 \ldots \lambda_N$ are reflected by the filter 10F and emerge from port P4. The signal with wavelength $\lambda_2$ passes through the filter 10F and emerges from the device 10 via the second port P2, joining the odd-numbered signals. The combination, signals $\lambda_1, \lambda_2, \lambda_3, \lambda_5 \ldots \lambda_M$, then passes via the fiber 22L to enter port P1 of the second four port device 12. The remaining signals with even-numbered wavelengths $\lambda_4, \lambda_6 \ldots \lambda_N$ leaving port P4 of device 10 pass via fiber 22R to enter port P3 of the second four port device 12.

Since four port device 12 contains filter 12F with a passband $\Lambda_4$, all of the signals with wavelengths $\lambda_1, \lambda_2, \lambda_3, \lambda_5 \ldots \lambda_M$ entering port P1 of device 12 will be reflected by the filter 12F and emerge via port P2. The signals with even-numbered wavelengths $\lambda_4, \lambda_6 \ldots \lambda_N$, entering via port P3, will be split. The signal with wavelength $\lambda_4$ will pass through the filter 12F to emerge at port P2. The remaining signals with wavelengths $\lambda_6 \ldots \lambda_N$ will be reflected by the filter 12F and emerge from port P4.

Since four port device 14 contains a filter with passband $\Lambda_6$, all the signals $\lambda_1, \lambda_2, \lambda_3, \lambda_4, \lambda_5 \ldots \lambda_M$ entering the device via port P1 are reflected by the filter 16F and emerge from device 16 via its port P2. The signals with wavelengths $\lambda_6 \ldots \lambda_N$ will be split by the filter 14F. The signal with wavelength $\lambda_6$ will pass through the filter 14F also to emerge via port P2. The remaining even numbered wavelengths . . . $\lambda_N$ will be reflected to emerge via port P4.

The bandpass filter 16F passes wavelength $\lambda_N$. Hence, on entering port P1 of device 16, the signals with wavelengths $\lambda_1, \lambda_2, \lambda_3, \lambda_4, \lambda_5, \lambda_6 \ldots \lambda_M$ are all reflected by the filter 16F and emerge from the device via port P2. The signal $\lambda_N$ entering the device 16 via port P3 will pass through the filter 16F and also emerge via port P2. At this point, all of the signals $\lambda_1, \lambda_2, \lambda_3, \lambda_4, \lambda_5, \lambda_6 \ldots \lambda_M, \lambda_N$ leave port 2 of device 16 and so are unidirectional when they arrive at the input IN of amplifier 20.

If there were more signals, with even and odd numbered wavelengths, additional four port devices would be included in the chain and the sequence continued in like manner until $\lambda_N$ passes through the $\lambda_N$ filter of the final device in the chain.

After amplification, the chaining process is reversed so that the odd numbered wavelengths exit into the fiber section 18R from port P3 of four port device 10 and the even numbered wavelengths exit into the fiber section 18L from port P1 of four port device 10. Thus, when the set of signals $\lambda_1, \lambda_2, \lambda_3, \lambda_4, \lambda_5, \lambda_6 \ldots \lambda_M, \lambda_N$ leave amplifier 20 and enter port P4 of device 16, the "unchaining" takes place in reverse order. The "unchaining" process will not be described step-by-step since it can be readily determined by reference to the drawing and the description of the "chaining" process.

It should be noted that, although the above-described embodiment of the invention is typical, in that the number of signals is the same in each direction, the number of signals need not be the same in each direction. Advantageously, however, where there is a difference, the four port devices should be arranged so that the signals which are transmitted through the devices are those which are fewer in number and the "even" wavelengths, e.g. $\lambda_2, \lambda_4, \lambda_6$ and $\lambda_8 \ldots \lambda_N$, so as to minimize the number of four port devices required. Hence, if there were two "even" wavelength signals propagating from East to West and more "odd"

wavelength signals propagating from West to East, only two four-port devices would be required, regardless of how many "odd" wavelength signals were propagating.

Figure 2:
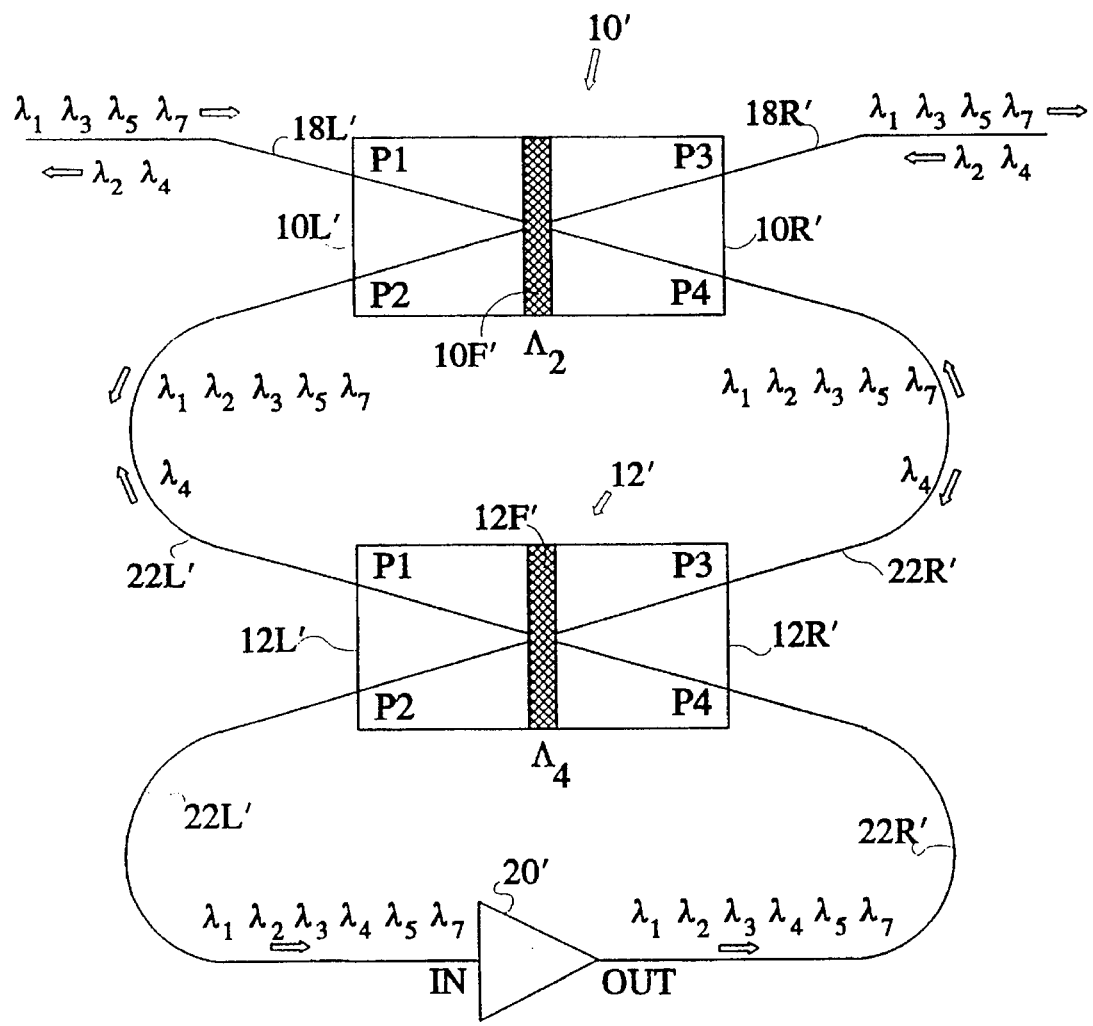
FIG. 2 is a schematic representation of an embodiment of the invention in which the number of different wavelength signals is different in each direction of propagation.

Such an embodiment of the invention, using two four-port devices, is illustrated in FIG. 2, in which items corresponding to items in FIG. 1 have the same reference number, but with a prime. Referring to FIG. 2, two four-port devices 10' and 12' comprise, as before, four ports P1, P2, P3 and P4. Ports P1 and P3 of device 12' are connected to ports P2 and P4 of device 10' by fiber links 22L' and 22R', respectively. Ports P2 and P4 of device 12' are connected to input IN and output OUT, respectively, of optical amplifier 20'. The sections 18R and 18L of the optical fiber transmission line are connected to ports P1 and P3, respectively, of device 10'. The transmission line carries a first group of WDM optical signals having "odd" wavelengths $\lambda_1$, $\lambda_3$, $\lambda_5$ and $\lambda_7$, shown in FIG. 2 as propagating from left to right, and a second group of only two WDM optical signals $\lambda_2$ and $\lambda_4$ propagating from right to left. The four-port devices 10' and 12' comprise bandpass optical filters 10F' and 12F' which transmit signals of wavelengths $\lambda_2$ and $\lambda_4$, respectively, and reflect optical signals having other wavelengths.

In operation, the "odd" optical signals $\lambda_1$, $\lambda_3$, $\lambda_5$ and $\lambda_7$ arriving at port P1 of device 10' will be reflected by filter 10F' and emerge from port P2 of the device, together with "even" optical signal $\lambda_2$ which, following its arrival at port P3 of device 10', will be transmitted by the filter 10F'. The other "even" optical signal $\lambda_4$ arriving at port P3 will be reflected by the filter 10F' to emerge from port P4.

On arrival at port P1 of device 12', the chain of optical signals $\lambda_1$, $\lambda_2$, $\lambda_3$, $\lambda_5$ and $\lambda_7$ will be reflected by filter 12F' to emerge from port P2 of device 12'. The single "even" optical signal of wavelength $\lambda_4$ entering port P3 of device 12A' will be transmitted by filter 12F' and also emerge from port P2. The chained "odd" and "even" signals $\lambda_1$, $\lambda_2$, $\lambda_3$, $\lambda_4$, $\lambda_5$ and $\lambda_7$ will then be applied to the input of amplifier 20'. Following amplification, the corresponding returning signals $\lambda_1$, $\lambda_2$, $\lambda_3$, $\lambda_4$, $\lambda_5$ and $\lambda_7$ will enter port P4 of device 12A'. Optical signal $\lambda_4$ will be transmitted to emerge from port P1 and the remaining signals will be reflected to emerge from port P3. On arrival at port P4 of device 10A', the "odd" optical signals $\lambda_1$, $\lambda_3$, $\lambda_5$ and $\lambda_7$ will be reflected by the filter 10F' and emerge from port P3 to continue propagating in the original direction, i.e. from left to right. The optical signal $\lambda_2$ entering port P4 will be passed by the filter 10F' and emerge from port P1 to propagate in the original direction i.e. right to left. Meanwhile, optical signal $\lambda_4$ entering port P2 will be reflected by filter 10F' also to emerge from port P1 to propagate from left to right. Thus, it will be seen that the number of four-port devices corresponds to the number of "even" wavelengths.

As used herein, the "even" direction is arbitrarily defined herein as the direction in which the fewer or fewest wavelengths of light are being propagated without, in fact, any reference to the actual direction of propagation in an actual network e.g. East to West or North to South; Left to Right or Right to Left.

It should be appreciated that, in either embodiment, it is not essential for the "odd" and "even" optical signals to alternate. One or more of either set could be omitted. Also, it is not essential for the filters to pass only one of the wavelengths. One or more of the filters could have a pass band wide enough for several optical signals to pass. It is also envisaged that each four-port device might comprise wavelength-dependent means which will pass several different wavelength signals, or reflect several different wavelength signals. In essence, therefore, the references to specific wavelengths of the optical signals should be interpreted as meaning optical signals within a band of wavelengths, corresponding to the pass band of the wavelength-dependent means or filter.

It should be appreciated that, although the four port devices of the preferred embodiment described herein employ one quarter pitch lenses and optical bandpass filters, the devices could comprise other optical components to achieve the required segregation of optical signals within the specified band of wavelengths. For example, it might be possible to employ fused tapered fibers, spherical or aspherical lenses, Fabry-Perot filters or grating in the structure of the invention. Hence, the amplifier 20 could be any other optical signal processing device for processing unidirectional optical signals.

It is also envisaged that appendage circuits may be employed to reduce or eliminate feedback paths within the invention or at the interface ports of the invention. such appendage circuits might take the from of an additional WDM device plus an isolator or a circulator.

It will be appreciated that the conversion apparatus of the present invention is not limited to use with repeater amplifiers in long transmission lines. The apparatus could be employed in other situations where it is required to convert bidirectional streams of wavelength-division multiplexed optical signals to unidirectional propagation for treatment, e.g. measurement, equalization, dispersion compensation, or signal detection, generation or regeneration simply by inserting it into a transmission medium.

It should also be appreciated that the invention embraces apparatus for converting in one direction only, i.e. from bidirectional to unidirectional, or from unidirectional to bidirectional. Thus, for example, one might employ embodiments of the invention to split a unidirectionally-propagating groups of WDM optical signals into two bidirectionally-propagating groups and then launch them into a fiber waveguide at an intermediate position, perhaps at the gateway node of a counter-rotating ring system.

Although an embodiment of the invention has been described and illustrated in detail, it is to be clearly understood that the same is by way of illustration and example only and is not to be taken by way of the limitation, the spirit and scope of the present invention being limited only by the appended claims.

What is claimed is:

1. Apparatus for processing wavelength-division multiplexed optical signals comprising first and second apparatus ports for connecting in an optical transmission path to receive, respectively, a first plurality of wavelength-division multiplexed optical signals propagating in a first direction in the transmission path and a second plurality of wavelength-division multiplexed optical signals propagating in an opposite direction in the transmission path, all of the signals of the first plurality having wavelengths different from all of the wavelengths of the signals of the second plurality, means coupled between the first and second apparatus ports for arranging the first plurality and second plurality of wavelength-division multiplexed optical signals to propagate unidirectionally, said coupled means comprising an output port for outputting the unidirectionally-propagating plurality of wavelength-division multiplexed optical signals, and an input port for receiving a corresponding unidirectionally-propagating plurality of wavelength-division multiplexed optical signals, the coupled means splitting said corresponding unidirectionally-propagating wavelength-division multiplexed optical signals into a first group of wavelength-division multiplexed optical signals and a second group of wavelength-division multiplexed optical signals having wavelengths corresponding to at least some of those of the first plurality of wavelength-division multiplexed optical signals and second plurality of wavelength-division multiplexed optical signals, respectively, the coupled means outputting the first and second groups of wavelength-division multiplexed optical signals to the transmission path via the second apparatus port and first apparatus port, respectively.

2. Apparatus as claimed in claim 1,
wherein said means coupled between the first and second apparatus ports comprises a series of three or more optical devices each comprising first, second, third and fourth ports and wavelength-selective means,
each of said wavelength-selective means selecting a different wavelength, each device coupling optical signals of its selected wavelength entering its first port to emerge from its fourth port, and vice versa, and coupling optical signals of its selected wavelength entering its second port to emerge from its third port, and vice versa; and coupling optical signals of other than its selected wavelength entering its first port to emerge via its second port, and vice versa, and coupling optical signals of other than its selected wavelength entering its third port to emerge via its fourth port, and vice versa;
each optical device other than the first optical device and last device in the series having its first and third ports coupled to the second and fourth ports, respectively, of the preceding device and its second and fourth ports connected to the first and third ports, respectively, of the succeeding device,
the first optical device having its first and third ports comprise the first and second apparatus ports respectively for connection to the transmission path, and said last optical device having its second and fourth ports comprise said output port and said input port, respectively.

3. Apparatus as claimed in claim 2, wherein each optical device comprises a pair of one quarter pitch graded index lenses with their respective first ends juxtaposed, the wavelength-selective means comprising an optical bandpass filter disposed between the juxtaposed first ends, the first and second ports being positioned at a distal end of one of the lenses and the third and fourth ports being positioned at a distal end of the other of the lenses, the optical bandpass filter having different passbands, the wavelengths of the optical signals falling within one of the passbands.

4. Apparatus as claimed in claim 2, wherein the number of signals in one of said first plurality of wavelength-division multiplexed optical signals and said second plurality of wavelength-division multiplexed optical signals is less than the number of signals in the other of said first plurality of wavelength-division multiplexed optical signals and said second plurality of wavelength-division multiplexed optical signals, the number of optical devices and the wavelengths of the wavelength selective means corresponding to those of said one of said first plurality of wavelength-division multiplexed optical signals and said second plurality of wavelength-division multiplexed optical signals.

5. Apparatus as claimed in claim 1, wherein the coupled means comprises first and second optical devices each comprising first, second, third and fourth ports and wavelength-selective means,
each of the plurality of wavelength-selective means selecting a different wavelength, each device coupling optical signals of its selected wavelength entering its first port to emerge from its fourth port, and vice versa, and coupling optical signals of its selected wavelength entering its second port to emerge from its third port, and vice versa; and coupling optical signals of other than its selected wavelength entering its first port to emerge via its second port, and vice versa, and coupling optical signals of other than its selected wavelength entering its third port to emerge via its fourth port, and vice versa;
the first optical device having its first and third ports comprise the first and second apparatus ports and its third and fourth ports connected to the first and third ports, respectively, of the second optical device, the second optical device having its second and fourth ports comprise said output port and said input port, respectively.

6. Apparatus as claimed in claim 5, wherein each optical device comprises a pair of one quarter pitch graded index lenses with their respective first ends juxtaposed, the wavelength-selective means comprising an optical bandpass filter disposed between the juxtaposed first ends, the first and second ports being positioned at a distal end of one of the lenses and the third and fourth ports being positioned at a distal end of the other of the lenses, the optical bandpass filters each having a different passband, each said different wavelength falling within a respective one of the passbands.

7. Apparatus for combining a first plurality of wavelength-division multiplexed optical signals and a second plurality of wavelength-division multiplexed optical signals to form a combined plurality of unidirectionally-propagating wavelength-division multiplexed optical signals and outputting the combined plurality of unidirectionally-propagating wavelength-division multiplexed optical signals via an output port, wherein all of the signals of the first plurality have wavelengths different from all wavelengths of the signals of the second plurality, said apparatus comprising:
first and second apparatus ports for receiving, respectively, said first plurality of wavelength-division multiplexed optical signals and said second plurality of wavelength-division multiplexed optical signals;
a series of three or more optical devices, each having first, second, third and fourth ports and wavelength-selective means,
each of said wavelength-selective means selecting a different wavelength, each device coupling optical signals of its selected wavelength entering its first port to emerge from its fourth port, and vice versa, and coupling optical signals of its selected wavelength entering its second port to emerge from its third port, and vice versa; and coupling optical signals of other than its selected wavelength entering its first port to emerge via its second port, and vice versa, and coupling optical signals of other than its selected wavelength entering its third port to emerge via its fourth port, and vice versa;
each optical device other than the first optical device and last optical device in the series having its first and third ports coupled to the second and fourth ports, respectively, of the preceding device in the series and its second and fourth ports connected to the first and third ports, respectively, of the next device in the series,
the first optical device having its first and third ports comprise the first and second apparatus ports, respectively, and said last optical device having its second port comprise said output port.

8. Apparatus as claimed in claim 7, wherein each optical device comprises a pair of one quarter pitch graded index lenses with their respective first ends juxtaposed, the wavelength-selective means comprising an optical bandpass filter disposed between the juxtaposed first ends, the first and second ports being positioned at a distal end of one of the lenses and the third and fourth ports being positioned at a distal end of the other of the lenses, the optical bandpass filters each having a different each said different wavelength falling within a respective one of the passbands.

9. Apparatus as claimed in claim 7, wherein the number of signals in one of said first plurality of wavelength-division multiplexed optical signals and said second plurality of wavelength-division multiplexed optical signals is less than the number of signals in the other of said first plurality of wavelength-division multiplexed optical signals and said second plurality of wavelength-division multiplexed optical signals, the number of optical devices and the wavelengths of the wavelength selective means corresponding to those of said one of said first plurality of wavelength-division multiplexed optical signals and said second plurality of wavelength-division multiplexed optical signals.

10. Apparatus for splitting a plurality of unidirectionally-propagating wavelength-division multiplexed signals into a first plurality of wavelength-division multiplexed optical signals and a second plurality of wavelength-division multiplexed optical signals, said apparatus comprising:

an input port for receiving said plurality of unidirectionally-propagating optical signals, and first and second apparatus ports;

a series of three or more optical devices each comprising first, second, third and fourth ports and wavelength-selective means, each of said wavelength-selective means selecting a different wavelength, each device coupling optical signals of its selected wavelength entering its first port to emerge from its fourth port, and vice versa, and coupling optical signals of its selected wavelength entering its second port to emerge from its third port, and vice versa; and coupling optical signals of other than its selected wavelength entering its first port to emerge via its second port, and vice versa, and coupling optical signals of other than its selected wavelength entering its third port to emerge via its fourth port, and vice versa;

each optical device other than the first optical device and last optical device in the series having its first and third ports coupled to the second and fourth ports, respectively, of the preceding device and its second and fourth ports connected to the first and third ports, respectively, of the succeeding device, the first optical device having its first and third ports comprise the first and second apparatus ports, respectively, and said last optical device having its fourth port comprise the input port.

11. Apparatus as claimed in claim 10, wherein each optical device comprises a pair of one quarter pitch graded index lenses with their respective first ends juxtaposed, the wavelength-selective means comprising an optical bandpass filter disposed between the juxtaposed first ends, the first and second ports being positioned at a distal end of one of the lenses and the third and fourth ports being positioned at a distal end of the other of the lenses, the optical bandpass filters each having a different passband, each said different wavelength falling within a respective one of the passbands.

12. Apparatus as claimed in claim 10, wherein the number of signals in one of said first plurality of wavelength-division multiplexed optical signals and said second plurality of wavelength-division multiplexed optical signals is less than the number of signals in the other of said first plurality of wavelength-division multiplexed optical signals and said second plurality of wavelength-division multiplexed optical signals, the number of optical devices and the wavelengths of the wavelength selective means corresponding to those of said one of said first plurality of wavelength-division multiplexed optical signals and said second plurality of wavelength-division multiplexed optical signals.

13. Apparatus for combining a first plurality of wavelength-division multiplexed optical signals and a second plurality of wavelength-division multiplexed optical signals to form a combined plurality of unidirectionally-propagating wavelength-division multiplexed optical signals and outputting the combined plurality of unidirectionally-propagating wavelength-division multiplexed optical signals via an output port, wherein all of the signals of the first plurality have wavelengths different from all wavelengths of the signals of the second plurality, said apparatus comprising:

first and second apparatus ports for receiving, respectively, said first plurality of wavelength-division multiplexed optical signals and said second plurality of wavelength-division multiplexed optical signals; and first and second optical devices, each having first, second, third and fourth ports and wavelength-selective means, each of said wavelength-selective means selecting a different wavelength, each device coupling optical signals of its selected wavelength entering its first port to emerge from its fourth port, and vice versa, and coupling optical signals of its selected wavelength entering its second port to emerge from its third port, and vice versa; and coupling optical signals of other than its selected wavelength entering its first port to emerge via its second port, and vice versa, and coupling optical signals of other than its selected wavelength entering its third port to emerge via its fourth port, and vice versa;

the first optical device having its first and third ports comprise said first and second apparatus ports, respectively, and its third and fourth ports connected to the first and second ports, respectively, of the second optical device, said second optical device having its second port comprise said output port.

14. Apparatus as claimed in claim 13, wherein each optical device comprises a pair of one quarter pitch graded index lenses with their respective first ends juxtaposed, the wavelength-selective means comprising an optical bandpass filter disposed between the juxtaposed first ends, the first and second ports being positioned at a distal end of one of the lenses and the third and fourth ports being positioned at a distal end of the other of the lenses, the optical bandpass filters each having a different passband, each said different wavelength falling within a respective one of the passbands.

15. Apparatus for splitting a plurality of unidirectionally-propagating wavelength-division multiplexed signals into a first plurality of wavelength-division multiplexed optical signals and a second plurality of wavelength-division multiplexed optical signals, said apparatus comprising:

an input port for receiving said plurality of unidirectionally-propagating wavelength-division multiplexed optical signals, and first and second apparatus ports;

first and second optical devices each comprising first, second, third and fourth ports and wavelength-selective means, each of said wavelength-selective means selecting a different wavelength, each device coupling optical signals of its selected wavelength entering its first port to emerge from its fourth port, and vice versa, and coupling optical signals of its selected wavelength entering its second port to emerge from its third port, and vice versa; and coupling optical signals of other than its selected wavelength entering its first port to emerge via its second port, and vice versa, and coupling optical signals of other than its selected wavelength entering its third port to emerge via its fourth port, and vice versa;

said first optical device having its first and third ports comprise the first and second apparatus ports, respectively, and its second and fourth ports connected to the first and third ports, respectively, of said second optical device, said second optical device having its fourth port comprise the input port.

16. Apparatus as claimed in claim 15, wherein each optical device comprises a pair of one quarter pitch graded index lenses with their respective first ends juxtaposed, the wavelength-selective means comprising an optical bandpass filter disposed between the juxtaposed first ends, the first and second ports being positioned at a distal end of one of the lenses and the third and fourth ports being positioned at a distal end of the other of the lenses, the optical bandpass filters each having a different passband, each said different wavelength falling within a respective one of the passbands.

* * * * *